United States Patent [19]

Hensel et al.

[11] Patent Number: 4,986,776
[45] Date of Patent: Jan. 22, 1991

[54] MARINE SHIFT SPEED EQUALIZER

[75] Inventors: Robert J. Hensel, Oshkosh; Richard E. Staerzl, Fond du Lac, both of Wis.

[73] Assignee: Burnswick Corporation, Skokie, Ill.

[21] Appl. No.: 368,770

[22] Filed: Jun. 20, 1989

[51] Int. Cl.⁵ .............................................. B63H 5/06
[52] U.S. Cl. .......................................... 440/87; 440/1; 123/335; 74/862
[58] Field of Search .................. 440/1, 75, 84, 86, 87; 74/843, 851, 852, 872, 856–858, 860–862, 874; 123/198 DC, 334, 335, 395, 399, 406

[56] References Cited

U.S. PATENT DOCUMENTS

| | | | |
|---|---|---|---|
| 4,111,174 | 9/1978 | Fitzner et al. | 123/218 CC |
| 4,244,336 | 1/1981 | Fitzner | 123/418 |
| 4,262,627 | 4/1981 | Dretzka | 440/86 |
| 4,306,535 | 12/1981 | Fitzner | 123/602 |
| 4,306,536 | 12/1981 | Fitzner | 123/602 |
| 4,318,387 | 3/1982 | Fitzner | 123/602 |
| 4,403,970 | 9/1983 | Dretzka | 440/86 |
| 4,432,734 | 2/1984 | Bland | 440/86 |
| 4,525,149 | 6/1985 | Broughton | 440/86 |
| 4,712,527 | 12/1987 | Staerzl | 123/418 |
| 4,726,798 | 2/1988 | Davis | 440/75 |
| 4,753,618 | 6/1988 | Entringer | 440/86 |
| 4,838,822 | 1/1989 | Friedle | 440/86 |

OTHER PUBLICATIONS

Mercury Marine Service Manual 90-97658, P. 7A-18, 1986.

Primary Examiner—Joseph F. Peters, Jr.
Assistant Examiner—Clifford T. Bartz
Attorney, Agent, or Firm—Andrus, Sceales, Starke & Sawall

[57] ABSTRACT

A shift speed equalizer is provided in a marine transmission in a marine drive subject to a decrease in engine speed upon shifting from neutral to a forward or reverse gear due to a high propeller pitch or the like, such as in bass boat applications, and subject to an increase in engine speed upon shifting back to neutral. The shift from neutral to forward or reverse is sensed, and engine speed is increased in response thereto, to compensate the decrease in engine speed due to shifting. The return shift back to neutral is sensed, and engine speed is decreased in response thereto, to compensate the increase in engine speed due to shifting. Engine speed is increased by advancing engine spark ignition timing, and engine speed is decreased by retarding or returning engine ignition timing to its initial setting. Particular methodology and structure is disclosed, including modifications to an existing shift plate and to an existing guide block to enable the noted functions, and including the addition of an auxiliary circuit to existing ignition circuitry enabling the desired altering of engine ignition timing to keep engine speed from dropping when shifting into forward or reverse.

19 Claims, 2 Drawing Sheets

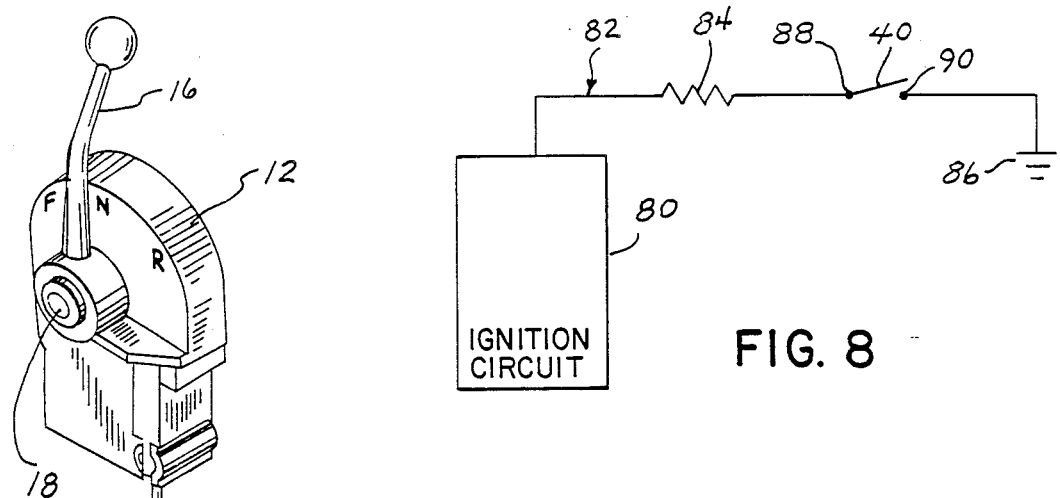
FIG. 8
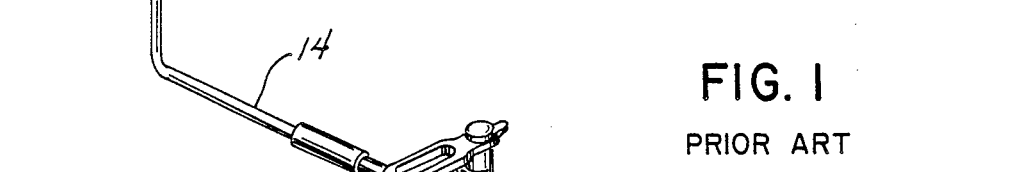
FIG. 1
PRIOR ART
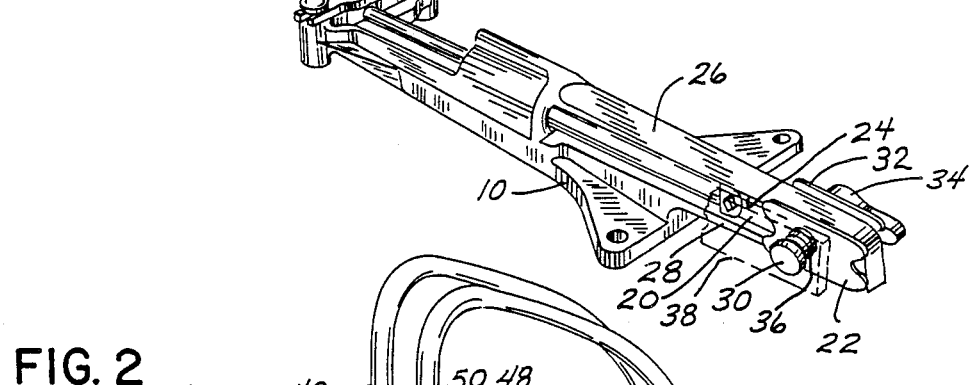
FIG. 2
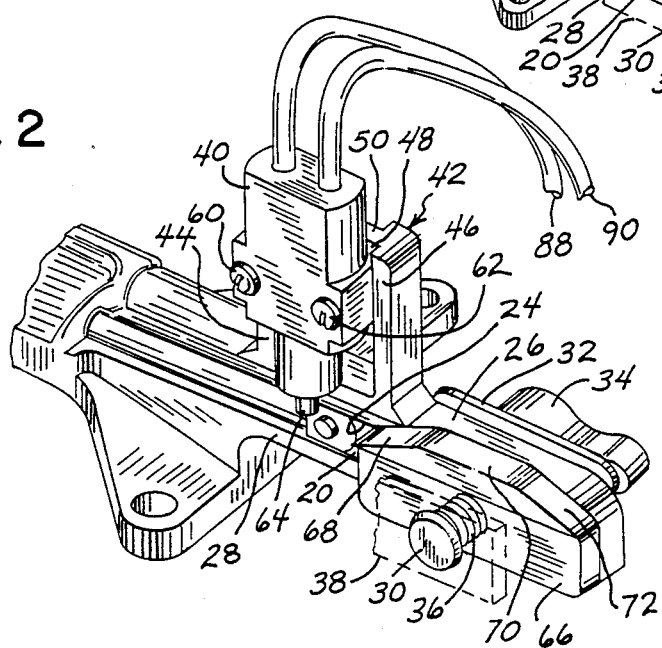

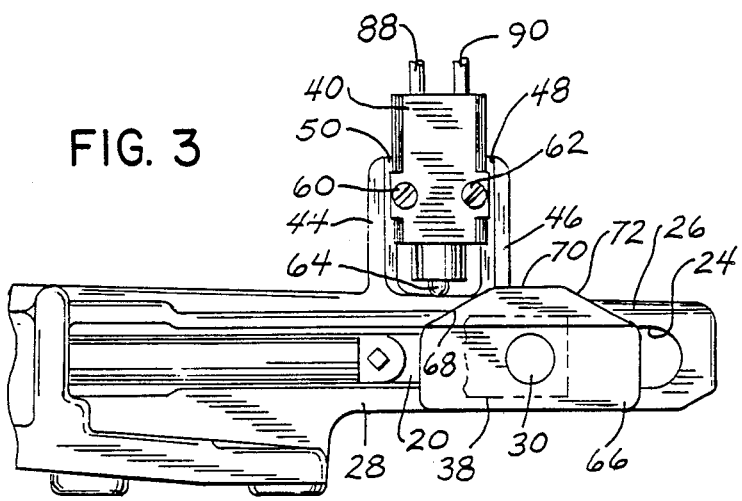
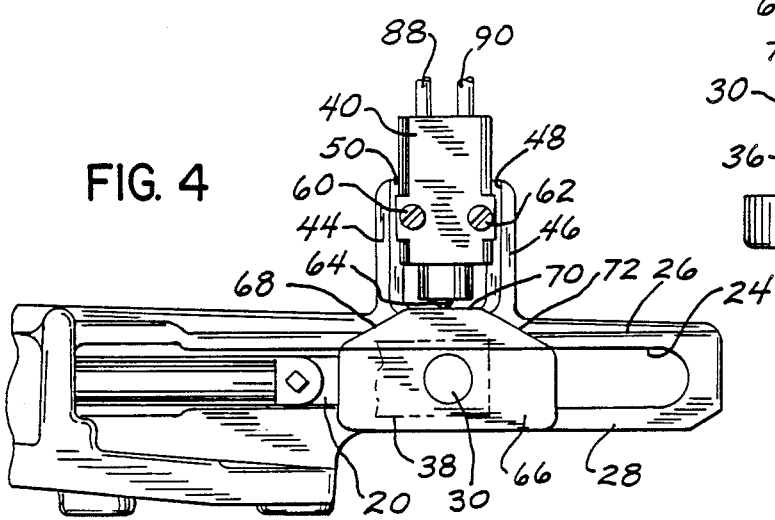
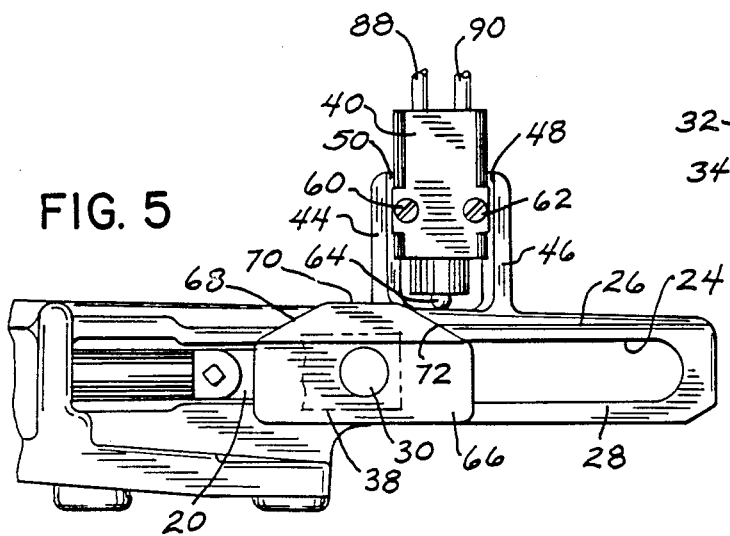
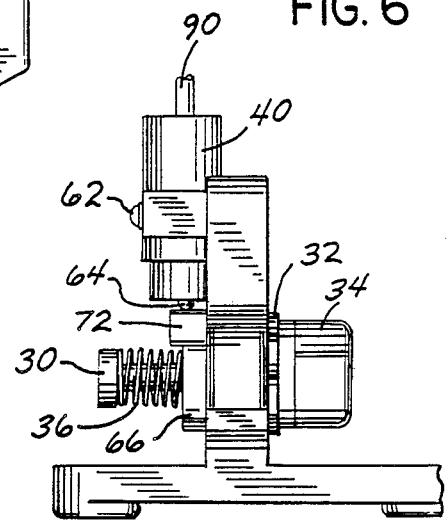
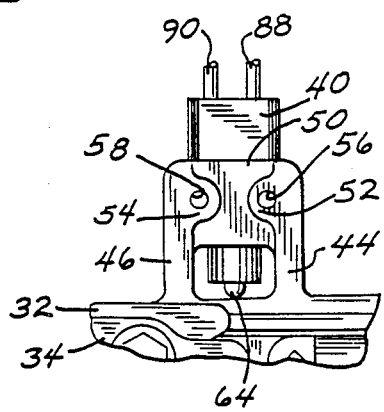

MARINE SHIFT SPEED EQUALIZER

BACKGROUND AND SUMMARY

The invention relates to marine propulsion systems, including marine transmission shifting systems.

In bass boat applications, when shifting from neutral to a forward or reverse gear, there is a drop in engine speed. This is due in large part to the load put on the engine by the high pitch propellers normally used in bass boat applications. The present invention addresses these and other types of boating applications where there is a drop in engine speed upon shifting into gear.

In the present invention, engine speed is increased in response to shifting into or out of gear. This is opposite to typical boating applications where engine speed is decreased, e.g. by interrupting the ignition, upon shifting into gear, in order to facilitate such shifting, for example Entringer U.S. Pat. No. 4,753,618 and Davis U.S. Pat. No. 4,726,798. Also known in the prior art are systems providing idle stabilization with spark timing along a negative slope such that as engine speed decreases, spark timing is advanced, and as engine speed increases, spark timing is retarded, thus providing self-stabilization, Staerzl U.S. Pat. No. 4,712,527. Such stabilization is a function of the ignition timing curve chosen for a particular speed range, not a shift condition.

In the present invention, to maintain an equal or nearly equal engine speed in-gear and out-of-gear, engine speed is changed upon shifting. In the preferred embodiment, ignition timing is advanced during the shift from neutral to forward and from neutral to reverse. When shifting back into neutral, the ignition timing is retarded, i.e. returned to its normal setting.

The altering of the ignition timing is performed electronically by connecting the ignition circuit through a resistor to ground. This is accomplished by mounting a switch on an existing shift plate. The shift plate is modified to provide mounting structure to accommodate the switch. An existing guide block on the shift plate is moved by the shift cable and is connected to the transmission for shifting the latter. The existing guide block is modified to have camming surfaces for actuating the switch between open and closed states to alter ignition timing.

In the preferred embodiment, when shifting into forward or reverse, the respective guide block camming surface becomes disengaged from the switch, such that the latter is in its normally closed state connecting the ignition circuit through the resistor to ground, which reduces the ignition circuit bias voltage and advances spark ignition timing electronically, which prevents the engine speed from dropping. Upon shifting back into neutral, the respective guide block camming surface engages the switch and actuates it to an open state, interrupting the noted connection through the resistor to ground, to return or retard ignition timing to its original point.

BRIEF DESCRIPTION OF THE DRAWINGS

FIG. 1 is a schematic view illustrating a marine shifting system known in the prior art.

FIG. 2 is an enlarged view of a portion of FIG. 1 and additionally shows modifications in accordance with the invention.

FIG. 3 is a front elevation view of the structure in FIG. 2.

FIG. 4 is a view like FIG. 3 and shows another operational position of the assembly.

FIG. 5 is a view like FIG. 4 and shows another operational position of the assembly.

FIG. 6 is an end elevation view of the structure in FIG. 2.

FIG. 7 is a rear elevation view of a portion of the structure in FIG. 2.

FIG. 8 is an electrical circuit diagram illustrating circuitry in accordance with the invention.

DETAILED DESCRIPTION

Prior Art

FIG. 1 illustrates a shift assembly known in the prior art for a marine transmission in a marine drive, for example Mercury Marine Service Manual 90-97658, p. 7A-18, 1986. The shift assembly includes a shift plate 10 mounted to the engine, a remote control shifter 12 operated by the boat operator between neutral, forward and reverse positions, and a shift cable 14 between shifter 12 and shift plate 10. Pivoting of handle 16 about pivot point 18 moves cable 14 which is connected to linkage 20 which in turn is connected to guide block 22 to move the latter along a rectilinear travel path along guide track 24 formed by upper and lower rails 26 and 28 of shift plate 10. Guide block 22 has a shift link extending therefrom provided by a threaded trunnion 30 extending through guide block 22 and then between upper and lower rails 26 and 28 and into a rear mating guide block 32 and anchor 34. Spring 36 biases trunnion 30 outwardly away from guide block 22. Anchor 34 includes a nut (not shown) threaded onto the end of trunnion 30 for adjusting the frictional drag of guide blocks 22 and 32 along guide track 24 resisting movement by linkage 20 and cable 14. Trunnion 30 is connected to the marine transmission shift linkage, shown in phantom at 38, for shifting the transmission.

Present Invention

The present invention provides shift speed equalization when shifting a marine transmission in a marine drive subject to a decrease in engine speed upon shifting the transmission from neutral to a forward or reverse gear due to a high propeller pitch or the like, such as in bass boat applications, and subject to an increase in engine speed upon shifting back to neutral. In accordance with the method of the present invention, a given shift condition is sensed indicating a given transmission shifting operation from neutral to forward. Engine speed is increased in response to the given shift condition to compensate the noted decrease in engine speed. A return shift condition indicating a return transmission shifting operation back to neutral is sensed. Engine speed is decreased in response to the return shift condition to compensate the noted increase in engine speed. These procedures are also performed for shifting from neutral to reverse, and return shifting back to neutral.

The noted transmission shifting operations are sensed by a switch 40, FIGS. 2-7, on shift plate 10. FIGS. 2-7 utilize like reference numerals from FIG. 1 where appropriate to facilitate clarity. Shift plate 10 is modified to include mounting structure 42 for accommodating and mounting switch 40. Mounting structure 42 has left and right sides 44 and 46 extending upwardly from upper guide rail 26 of shift plate 10 and defining a vertical channel 48 therebetween receiving and guiding switch 40 downwardly thereinto. Sides 44 and 46 have a central cross bar 50 extending therebetween against which the backside of switch 40 rests. The rear surfaces of sides 44 and 46 curve inwardly towards each other as shown at 52 and 54, FIG. 7, and have threaded bores 56 and 58 receiving respective screws 60 and 62, FIG. 2, mounting switch 40 to mounting structure 42. Switch 40 has a movable actuator plunger 64 extending vertically downwardly therefrom and perpendicularly to trunnion bolt 30 and perpendicularly to the rectilinear path of movement of guide block 66, to be described.

Guide block 22 of FIG. 1 is modified in FIGS. 2–7 to provide guide block 66 having camming surfaces 68, 70 and 72 on the top surface thereof engagable with switch actuator plunger 64 which extends into the path of movement of the camming surfaces of guide block 66. Camming surfaces 68 and 72 are oppositely inclined and separated by flat substantially horizontal surface 70. Camming surfaces 68, 70, 72 move rectilinearly along the side of upper rail 26 of the shift plate. Switch 40 is mounted to mounting structure 42 above upper rail 26 such that switch actuator plunger 64 extends downwardly and is spaced to the side of upper rail 26 in alignment with camming surfaces 68, 70, 72 of guide block 66.

In the position shown in FIGS. 2 and 3, camming surface 68 is rightward of and out of engagement with switch actuator plunger 64. Upon leftward movement of guide block 66, camming surface 68 engages plunger 64 and cams the latter upwardly to a depressed position. Continued leftward movement of guide block 66, FIG. 4, brings camming surface 70 into engagement with actuator plunger 64 in a neutral position of the shift assembly and maintains plunger 64 in its upward depressed position. Upon further continued leftward movement of guide block 66, camming surface 72 initially engages plunger 64 and then disengages plunger 64, FIG. 5, such that plunger 64 moves from its upward depressed position to a lower extended position. The rightward position of guide block 66 in FIG. 3 corresponds to the reverse gear position of the shift assembly, and the leftward position of guide block 66 in FIG. 5 corresponds to the forward gear position.

In the preferred embodiment of the invention, engine speed is increased, in response to the above noted shift condition into forward or reverse, by advancing engine ignition timing. Engine speed is decreased, in response to the return shift condition back to neutral, by retarding engine timing, i.e. returning ignition timing back to its normal nonadvanced point. The engine includes an ignition circuit 80, FIG. 8, for which further reference may be had to U.S. Pat. Nos. 4,244,336, 4,318,387, 4,306,536, 4,306,535 and 4,111,174, incorporated herein by reference. Ignition circuit 80 controls the spark ignition timing of the engine. An auxiliary circuit 82 is provided including a resistor 84 and switch 40 connected in series between ignition circuit 80 and ground at 86. The terminal connection wires for switch 40 are shown at 88 and 90, FIGS. 8 and 2. Switch 40 has a normally closed state such that in the position shown in FIGS. 3 and 5 actuator plunger 64 is in its extended position which actuates switch 40 to such normally closed state which in turn completes auxiliary circuit 82 from ignition circuit 80 through a resistor 84 and closed switch 40 to ground at 86. This advances engine spark ignition timing by reducing the ignition circuit bias voltage, i.e. by reducing the voltage on ignition system bias capacitor 17 in above incorporated U.S. Pat. No. 4,244,336. In the neutral position, FIG. 4, camming surface 70 depresses actuator plunger 64 to actuate switch 40 to its open state opening or interrupting auxiliary circuit 82 to interrupt the connection of ignition circuit 80 through resistor 84 to ground at 86, such that ignition timing is retarded or returns back to its normal setting and is unaffected by resistor 84.

It is recognized that various equivalents, alternatives and modifications are possible within the scope of the appended claims.

I claim:

1. A method of providing shift speed equalization when shifting a marine transmission in a marine drive subject to a decrease in engine speed upon shifting said transmission from neutral to a forward or reverse gear, and subject to an increase in engine speed upon shifting back to neutral, comprising:
   sensing a given shift condition indicating a given transmission shifting operation from neutral to one of said forward and reverse gears;
   increasing engine speed in response to said given shift condition to compensate said decrease in engine speed due to said shifting;
   sensing a return shift condition indicating a return transmission shifting operation back to neutral;
   decreasing engine speed in response to said return shift condition to compensate said increase in engine speed due to said shifting.

2. The invention according to claim 1 comprising:
   sensing another shift condition indicating another transmission shifting operation from neutral to the other of said forward and reverse gears;
   increasing engine speed in response to said other shift condition to compensate said decrease in engine speed due to said shifting;
   sensing another return shift condition indicating another return transmission shifting operation back to neutral from said other of said forward and reverse gears;
   decreasing engine speed in response to said other return shift condition to compensate said increase in engine speed due to said shifting.

3. The invention according to claim 1 comprising:
   increasing said engine speed in response to said given shift condition by advancing engine ignition timing;
   decreasing said engine speed in response to said return shift condition by retarding engine ignition timing.

4. The invention according to claim 3 wherein said engine comprises an ignition circuit, and comprising connecting said ignition circuit in series with a resistor to ground to alter said engine ignition timing and change said engine speed.

5. The invention according to claim 4 comprising completing an electrical connection from said ignition circuit through said resistor to ground in response to said given shift condition, and interrupting said electrical connection in response to said return shift condition.

6. A shift speed equalizer assembly for a marine transmission in a marine drive subject to a decrease in engine speed upon shifting said transmission from neutral to a forward or reverse gear, and subject to an increase in engine speed upon return shifting back to neutral, comprising:
   a shift plate for controlling shifting of said transmission between neutral and forward and reverse gears;

a remote control shifter operated by the boat operator between neutral, forward and reverse positions;

a shift cable between said remote control shifter and said shift plate;

a guide block on said shift plate and coupled to said cable and moved between neutral, forward and reverse positions in response to movement of said cable, said guide block having camming surfaces thereon;

a switch on said shift plate engaged by at least one of said camming surfaces of said guide block in at least one of said positions of said guide block, said switch having a first condition increasing engine speed, and a second condition decreasing engine speed, said switch being in said first condition in at least one of said forward and reverse positions of said guide block to increase engine speed to compensate said decrease in engine speed due to said shifting, said switch being in said second condition when said guide block is in said neutral position to decrease engine speed to compensate said increase in engine speed due to said shifting.

7. The invention according to claim 6 wherein said switch is also in said first condition when said guide block is in the other of said forward and reverse positions.

8. The invention according to claim 7 wherein said marine drive includes an ignition circuit controlling ignition timing of said engine, and comprising an auxiliary circuit including a resistor and said switch connected in series between said ignition circuit and ground, such that the condition of said switch controls completion of said auxiliary circuit from said ignition circuit through said resistor to ground to alter said ignition timing.

9. The invention according to claim 8 wherein said switch in said first condition is in a closed state completing said auxiliary circuit through said resistor from said ignition circuit to ground, and wherein said switch in said second condition is in an open state interrupting said auxiliary circuit.

10. The invention according to claim 9 wherein said switch has a movable actuator extending into the path of said guide block, said actuator being engaged and depressed by a respective said camming surface of said guide block in said neutral position of the latter to actuate said switch to said open state, and such that movement of said guide block away from said neutral position to either of said forward or reverse positions moves said last mentioned camming surface out of engagement with said switch actuator to actuate said switch to said closed state.

11. A shift assembly for shifting a marine transmission of a marine drive and sensing the position of said assembly, comprising:

a shift plate for controlling shifting of said marine transmission;

a remote control shifter operated by a boat operator;

a shift cable between said remote control shifter and said shift plate;

a guide block on said shift plate and coupled to said cable and moved thereby along a rectilinear travel path, said guide block having one or more camming surfaces thereon;

an electric switch mounted on said shift plate and having a movable actuator extending into the path of movement at least one of said camming surfaces of said guide block and actuated thereby during movement of said cable, wherein said guide block moves along said rectilinear travel path beneath said switch, and wherein said camming surfaces are on the top of said guide block and engagable with said switch actuator, wherein said shift plate has a rectilinear guide track with an upper rail, and comprising mounting structure attached to said upper rail and supporting said switch.

12. The invention according to claim 11 wherein said mounting structure extends upwardly from said guide track and has a vertical channel therein receiving and guiding said switch downwardly thereinto and locating said switch above said camming surfaces of said guide block.

13. The invention according to claim 12 wherein said mounting structure includes left and right sides extending upwardly from said upper rail and defining said vertical channel therebetween and having a central cross bar extending therebetween, and wherein said switch has a backside resting against said central cross bar.

14. The invention according to claim 13 wherein said left and right sides of said mounting structure have rear surfaces extending inwardly towards each other and having threaded bores receiving screws mounting said switch.

15. The invention according to claim 11 wherein said guide block moves along said track and wherein said camming surfaces on said guide block move rectilinearly along the side of said upper rail, and wherein said switch is mounted to said mounting structure above said upper rail such that said switch actuator extends downwardly and is spaced to the side of said upper rail in alignment with said camming surfaces of said guide block.

16. The invention according to claim 15 wherein said switch actuator comprises a depressable plunger extending downwardly substantially perpendicularly to the rectilinear travel path of said guide block.

17. The invention according to claim 15 wherein said camming surfaces on said guide block comprise first and second oppositely inclined surfaces separated by a flat substantially horizontal surface.

18. The invention according to claim 17 wherein the first of said inclined camming surfaces engages said switch actuator during a first portion of travel of said guide block and moves said switch actuator from a first to a second position, said substantially horizontal camming surface of said guide block engages said switch actuator and maintains the latter in said second position during a second portion of travel of said guide block, and the second of said inclined camming surfaces of said guide block initially engages and then disengages said switch actuator during a third portion of travel of said guide block such that said switch actuator moves from said second position to said first position.

19. A shift assembly for shifting a marine transmission of a marine drive and sensing the position of said assembly, comprising:

a shift plate having a guide track defining a given travel path;

a guide block on said shift plate and movable along said guide track;

a shift link extending from said guide block for shifting said transmission;

a remote control shifter operated by the boat operator between neutral, forward and reverse positions;

a shift cable between said remote control shifter and said shift plate and coupled to said guide block for moving the latter along said guide track to in turn move said shift link and shift said transmission between neutral and forward and reverse gears;

a plurality of camming surfaces formed on said guide block;

a switch mounted on said shift plate and having a movable actuator extending into the path of movement of said guide block and engagable by at least one of said camming surfaces, wherein said shift link extending from said guide block comprises a threaded trunnion mounting said guide block to said guide track and adjustably controlling frictional drag of said guide block along said guide track resisting movement by said cable, said guide block moves generally horizontally rectilinearly along said guide track, said trunnion extends generally horizontally and perpendicularly to said rectilinear path of movement of said guide block, said switch actuator comprises a plunger movable generally vertically and perpendicularly to said trunnion and perpendicularly to said rectilinear path of movement of said guide block.

* * * * *